US009865160B2

(12) United States Patent
Puppo

(10) Patent No.: US 9,865,160 B2
(45) Date of Patent: Jan. 9, 2018

(54) SYSTEM AND METHOD FOR THE REMOTE CONTROL OF THE SHARED ACCESS TO ONE OR MORE ITEMS

(71) Applicant: Mario Puppo, Taggia (IT)

(72) Inventor: Mario Puppo, Taggia (IT)

(*) Notice: Subject to any disclaimer, the term of this patent is extended or adjusted under 35 U.S.C. 154(b) by 0 days.

(21) Appl. No.: 15/323,605

(22) PCT Filed: Jul. 6, 2015

(86) PCT No.: PCT/IB2015/055079
§ 371 (c)(1),
(2) Date: Jan. 3, 2017

(87) PCT Pub. No.: WO2016/001903
PCT Pub. Date: Jan. 7, 2016

(65) Prior Publication Data
US 2017/0140643 A1 May 18, 2017

(30) Foreign Application Priority Data
Jul. 4, 2014 (IT) .............................. RM2014A0358

(51) Int. Cl.
G08C 17/02 (2006.01)
H04W 12/08 (2009.01)

(52) U.S. Cl.
CPC ............ *G08C 17/02* (2013.01); *H04W 12/08* (2013.01); *G08C 2201/21* (2013.01); *G08C 2201/93* (2013.01)

(58) Field of Classification Search
CPC G08C 17/02; G08C 2201/21; G08C 2201/93; H04W 12/08; H04L 63/0464

USPC ......................................... 340/5.61; 455/419
See application file for complete search history.

(56) References Cited

U.S. PATENT DOCUMENTS 7,868,738 B2 * 1/2011 Dasgupta .............. G06F 9/4443
340/10.32
2011/0003588 A1 1/2011 Millet Sancho

OTHER PUBLICATIONS

International Search Report, dated Oct. 7, 2015, from corresponding PCT Application.

* cited by examiner

Primary Examiner — Ali Neyzari
(74) Attorney, Agent, or Firm — Young & Thompson

(57) ABSTRACT

A system and method for remotely controlling access of at least one user to one or more properties belonging to an owner in order to share the properties, wherein at least one electric interface device is connected to controlling and/or servoassisting elements associated with one property and configured to perform at least one electric, electromechanical and/or optical interaction with the property. Each electric interface device is remotely connected to a mainframe via a long-distance communication line. The identification data of the user, the property to be shared and the allowed interactions with each electric interface device associated with the property, are stored in the memory of the mainframe. A data communication is established between the electric interface device and the mainframe and temporarily assigned to the user which enables one or more interactions with the at least one electric interface device associated with a property.

21 Claims, 3 Drawing Sheets

Figure 1:
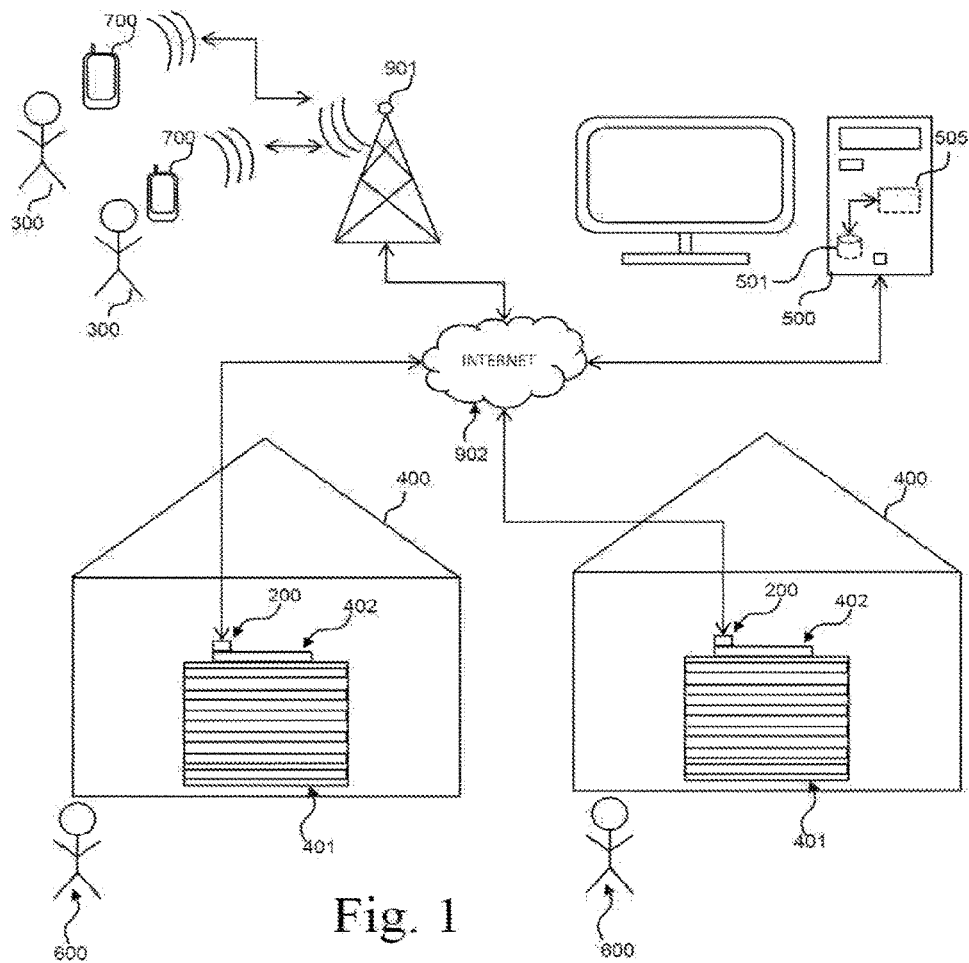

SYSTEM AND METHOD FOR THE REMOTE CONTROL OF THE SHARED ACCESS TO ONE OR MORE ITEMS

TECHNICAL FIELD

The present invention generally refers to the field of electronic controlling systems and, in detail, concerns a remote controlling system to control electric devices by a plurality of users for the controlled sharing of owner's properties. In detail, the present invention concerns also a method for remotely controlling the access of at least one user to one or more properties belonging to an owner, and the respective system for performing the same method.

PRIOR ART

Nowadays a great number of electronic and/or electric devices are known, which are able to perform an enormous variety of functions comprising those actuating the mechanical controls.

Typically, these devices are controlled directly by a user, or indirectly or remotely by a remote control systems that can be wired or wireless.

Moreover, it is known that these remote control systems can also be developed so that the user can be connected by a computer directly connected to the electronic and/or electric device through the Internet.

The Applicant observed that is a long time the sharing of movable and real properties spread among a plurality of users. In the case in point such sharing, that practically can be a rental or a leasing, often needs a movement of persons to a specific meeting place to define not only details of property sharing, but also to give the tools for accessing or using the property itself. For example, in case of a garage rental, in order to open the same garage the keys have to be given necessarily.

These operations become difficult to be managed, particularly if a user or owner has to manage a great number of shared properties. For example, managing the sharing of a great number of garages or houses would oblige to manage an at least equally great plurality of keys. If these keys are copied or not returned, the sharing system could collapse, as a garage assignment to two different users could happen contemporaneously.

The Applicant further observed that a lot of movable and real properties are provided with electric, electronic or electromechanical devices allowing doors or windows to be opened or closed, or the possibility thereof, and observed how these devices could aid a controlled sharing of properties.

What reported above is valid also in case of access to hotel rooms, in which nowadays guests are provided with access keys or magnetic and/or RFID cards for accessing to the room and, in some cases, activating the lighting thereof. Also in this case, cards and keys can be lost and this entails costs and problems. But the use of cards or keys imposes anyway a delay from when the user leaves the room and when the latter is effectively "free" on the hotel web portal; in fact, a human intervention is necessary to update the room status.

In this regard, the Applicant observed that although hotel room use could substantially take the "occupied" or "free" status daily, there are a lot of many others sharing services in which the availability or unavailability of the shared property can change also more frequently, for example hourly as in case of car renting.

The US patent application No. 2011/0003588 describes a system for remotely managing properties, optionally also shared properties, by the use of a mobile phone. The system described in this document provides for the use of a controller associated with the property, in order to perform given operations that can be activated by a mobile phone. The controller is connected to a main server via a long-distance communication line, for example the Internet or the like, and to one or more enabled mobile phones via a short-distance communication line, for example a Bluetooth® standard communication or the like. The controller includes a memory in which identification data of users authorized to interact with the same controller are stored. Analogously, enabled mobile phones include a memory storing identification data of properties and respective controllers to which the access is possible, as well as data identifying which actuators connected to each controller can be enabled by commands of a specific mobile phone.

However, this known system has evident practical limits. In fact, the enable by the owner to interact with each controller is not assigned to a user, but to a phone.

This results in drawbacks in case the user is temporarily not provided with the enabled mobile phone, or is temporarily not able to use it, when a command has to be sent to a specific controller. In this case, the user could contact the owner to ask for the enable of another user-available mobile phone, but this procedure is rather complex as the owner has to notify the data of the new enable to the server, then the latter must send the respective data to the relevant controller and to the new mobile phone to be enabled, so that these data can be stored in the respective memories of the controller and phone.

Moreover, the user interaction by the mobile phone is carried out via a short-distance connection from the mobile phone, whereas the remote intervention of the owner too would be desirable for the direct interaction with the controller to be enabled.

It has to be noted that information referring to status of each controller and identification of an authorized user can be difficultly provided to the enabling owner.

Although sharing of real and movable properties are desirably managed in the most fluent possible way, however they have to be controlled and managed centrally, in order to aid the owners of the same properties to manage the sharing without loss of control of the users using them.

An object of the present invention is then to propose a method for remotely controlling the access of one or more users to one or more owner's properties, for the controlled property sharing, which allows solving the above described drawbacks.

Another object of the present invention is then to provide a system for remotely controlling the access of one or more users to one or more owner's properties, for the controlled property sharing, which allows solving the above described drawbacks.

SUMMARY OF THE INVENTION

According to a first aspect of the present invention, a method is proposed for remotely controlling the access of at least one user to one or more properties belonging to an owner in order to share said properties, the method comprising the steps of:
 a) installing at least one electric interface device connected to controlling and/or servoassisting means associated with one property, so that said electric interface device can cause at least one electric, electromechanical, mechanical and/or optical interaction with said property;
b) establishing a data communication between said at least one electric interface device and a mainframe comprising a memory, in which data of connection with said at least one electric interface device are contained, and managing means to manage the interactions, by sharing them with at least one user, with said at least one electric interface device associated with the property,
c) temporarily assigning to a user the enable to one or more interactions with said at least one electric interface device associated with said property, wherein the assignment is stored in the memory of said mainframe by the identification of the user, the property to be shared and the allowed interactions with said at least one electric device associated with the property and wherein, following the assignment, said user is authorized to send at least one interaction command with said at least one electric interface device via a remote connection, from a user interface device of the user.

Before the step c), the logging of each user is advantageously provided through an Internet or Intranet portal on which one or more properties are identifiable, which have been provided by said owner to a user for sharing one or more interactions with said at least one electric interface device associated with one or more properties.

Before the step c), moreover the availability of said at least one property and of possible interactions in the same time period said user required, is checked.

Still before said step c), the access credentials of said user are checked and the authorization of the owner is required for sharing the property and using one or more interactions with an electric interface device associated with the same property.

After said step c), the access to said property and the interactions therewith by said user are required by said user to said mainframe through an interface device associated with said user.

Furthermore, after said step c), each interaction of said user with an electric interface device associated with said property can be notified to said owner through said mainframe.

The method advantageously provides the assignment of enable to the interaction with an electric interface device associated with said property by said user to be assigned for a time interval stored in the memory of said mainframe.

According to a second aspect of the present invention, a system is provided for remotely controlling the access of at least one user to one or more properties belonging to an owner in order to share said properties, the system comprising:
at least one electric interface device connected to controlling and/or servoassisting means associated with one property and configured to perform at least one electric, electromechanical and/or optical interaction with said property;
a mainframe comprising least one memory in which data of connection with said at least one electric interface device are contained and managing means to manage the interactions, by sharing them with at least one user, with said at least one electric interface device associated with the property, wherein said managing means are programmed to temporarily assign to a user the enable to one or more interactions with said at least one electric interface device associated with said property, and wherein the identification data of the user, the property to be shared and the allowed interactions with said at least one electric interface device associated with the property, are stored in the memory of said mainframe.

Advantageously, the managing means of said mainframe are configured to send to the electric interface device the driving signals received from a user to activate the enabled interactions with at least one electric interface device associated with said property.

Advantageously, the memory of said mainframe further comprises data relating to commands enabled by said owner for the interaction of said user with said at least one electric interface device.

The system further comprises an electronic user interface device of a user, wherein said electronic user interface device comprises transceiving means for the remote connection with said mainframe.

Advantageously, said electronic user interface device is configured to submit to the user a list of enabled commands for the interaction with said electric interface device and for transmitting the selection of at least one command of said list towards said mainframe.

Advantageously, said electronic user interface device can be configured to read and interpret a bar code or a QR code associated with said property, and wherein said bar code or said QR code have at least the information of connection with said mainframe.

Advantageously, said electric interface device comprises a plurality of analog and/or digital outputs for the connection with said controlling and/or servoassisting means associated with said property.

Advantageously, said electric interface device comprises:
first interface means for the electric, electromechanical and/or optical interface to controlling and/or servoassisting means associated with a property;
second interface means for the interface to at least one control computer connectable with at least one user, wherein said second interface means are configured to receive at least one signal for driving, managing, activating and/or deactivating said controlling and/or servoassisting means associated with a property;
at least one data processing unit configured to generate driving signals addressed to said controlling and/or servoassisting means associated with a property by processing said driving signals to said controlling and/or servoassisting means in compliance with a data communication protocol or data relay protocol specific for each of said controlling and/or servoassisting means.

Advantageously, said electronic interface device is configured in accordance with an automatic configuration mode upon of said first interface means to said controlling and/or servoassisting means and wherein, in said automatic configuration mode, said electronic interface device automatically acquires said data communication protocol or data relay protocol specific for each of said controlling and/or servoassisting means.

Advantageously, said second interface means comprise at least one network interface electrically connected with at least one data processing unit and configured to allow remotely receiving said signals for driving, managing, activating and/or deactivating the controlling and/or servoassisting means through said mainframe to which said user transmits said commands by means of an electronic user interface device.

Advantageously, said second interface means comprise at least one antenna configured for receiving radio-frequency signals transmitted by an electronic user interface device associated with said user.

Advantageously, said first interface means comprise at least one interface selected from an optoelectronic interface, an electric transceiving interface, an electromechanical actuating interface.

The present invention further provides the implementation of a computer program product, stored on a storage medium readable by a computer and/or downloadable from a communication network, characterized by comprising portions of executable code to implement at least the following functions:

- remotely checking the availability of at least one property associated with an electric interface device for the electric, electromechanical and/or optical interface to controlling and/or servoassisting means associated with a property and in communication with said electric interface device, wherein the checking causes the establishment of a communication with a mainframe on which a list of properties is stored, each of the latter being associated with at least one respective electric interface device;
- transmitting commands to said electric interface device associated with said property, wherein said commands are transmitted from said mainframe to the electric interface device when the enable of the user has been checked, following the request of the user sent by a user interface device.

Advantageously, the program for processor comprises portions of executable code to implement the submission, on a user interface device of a user, of a list of commands enabled for the user and executable by the electric interface device, and wherein said list of commands said electric interface device can execute has been previously defined by an owner of the property to which said electric interface device is associated.

DESCRIPTION OF THE ATTACHED FIGURES

Figure 2:
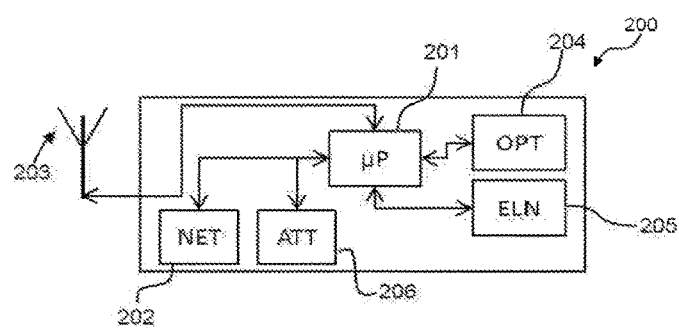
Figure 3:
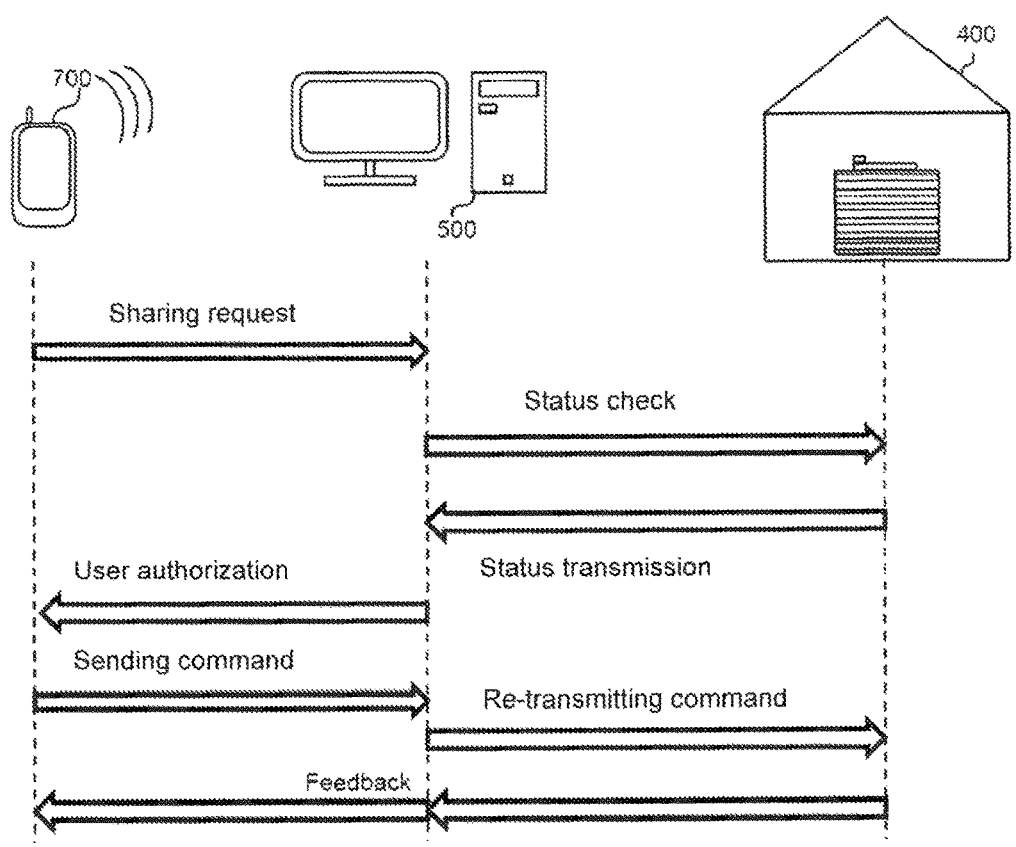
Figure 4:
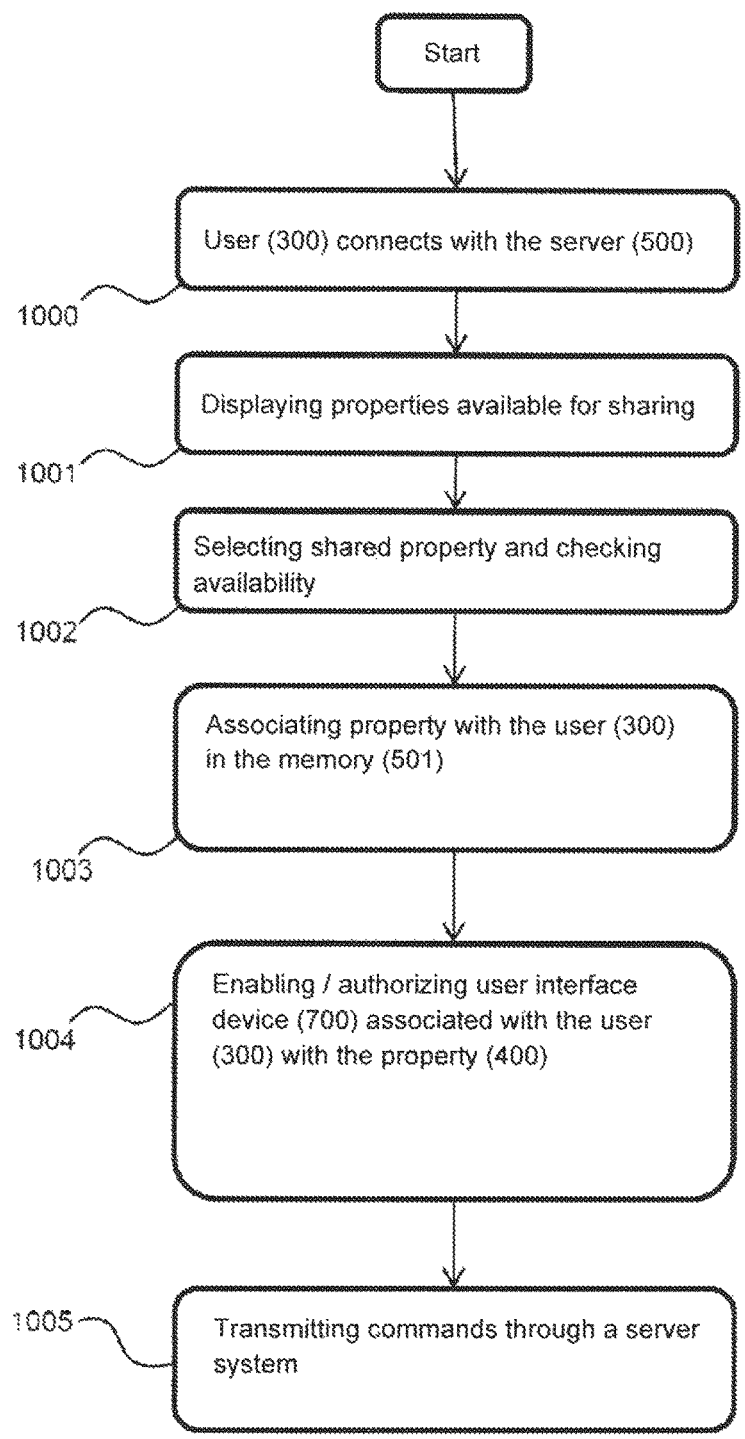

During the present description, the Applicant will illustrate a possible, non-limiting embodiment of the invention, referring to the appended figures, wherein:

FIG. 1 illustrates a general block diagram of a possible embodiment of the system object of the present invention;

FIG. 2 illustrated in detail an electric interface device adopted in a system according to the present invention;

FIG. 3 illustrates a first operating mode of the system object of the present invention; and FIG. 4 illustrates a flow diagram of an operating mode of the system object of the present invention.

DETAILED DESCRIPTION OF THE INVENTION

Referring to FIG. 1 and FIG. 2, with reference numeral 200 an electric interface device for the centralized interface and remote sharing of electric devices to a plurality of users, is indicated on the whole.

Such a device works inside a more complex remote controlling systems of electric devices to be operated by a plurality of users for the controlled sharing of properties, whose operation will be better described during the present invention, and whose purpose is to allow an owner 600 of uric or more movable or real properties 400 to easily and efficiently manage the sharing with a plurality of users 300 without the possibility of inconvenient superimpositions in property assignment and being able to manage the assignment of said at least one movable or real property 400 directly from remote.

In detail, the device 200 comprises a data processing unit 201 electrically connected with first interface means 204, 205, 206, 203 which are configured so that to be connected with the electronic or electromechanical devices 402 installed on said property. These interface means preferably and without limitation comprise a first interface 205 of electronic or electric type, an optoelectronic interface 204, a mechanically servocontrolled interface 206 and a radio interface 203—the latter being schematically depicted in FIG. 1 by an antenna.

These first interface means then allow exchanging—herein meant as transceiving—electric driving signals of electronic or electromechanical devices, for example of home automation type such as automated rolling shutters, door openers, air conditioning systems, lighting and/or heating systems, anti-theft systems. This obviously in case the property 400 is a house or an office, and more in general a real property. However, said electric or electromechanical devices 402 could also be central locking systems of vehicles, or else a small gate for vehicle parking or a chain with electrically operated lock for locking cycles or motorcycles.

Each of these electric or electromechanical devices is of heterogeneous type, i.e. it is not necessary that all products are manufactured by the same producer and operating on a common relay protocol of electric driving signals.

On the contrary, the device 200 is just configured as a means of standardized interface, which is able to allow automatically operating with electric and/or electromechanical devices 402 in a totally automatic way and independently from the relay protocol they use; on the other hand, one of the advantages of the device 200 is to be of "plug and play" type, i.e. able to activate an automated procedure of recognition of different typologies of electric and/or electromechanical device 402 with no complex installation procedures.

Alternatively to said automated recognition procedure, the electronic device 200 can be operated manually, for example and without limitation via a driving port thereof—for example an USB or wirelessly or via the network port of the same device—so that the operating parameters of the various electric and/or electromechanical devices 402 can be selected, which will be interfaced to the electronic device 200, in case by specifying their access or password codes for the data interfacing and transceiving.

The device 200, just for this reason and for its great variety of interface devices, is simple to be installed and does not need big masonry or wiring works, thereby being advantageously able to be installed in short times also in houses that previously have independent home automation devices with communication protocol solutions of proprietary type.

The device 200 further comprises second interface means 203, 202 towards at least one system user 300.

Such second interface means, which comprise at least one antenna 203 and one network interface 202, advantageously allow receiving electric driving signals of said at least one electric and/or electromechanical device 402, which allow the latter to be controlled or managed and activated and/or deactivated.

Such second interface means 202, 203 are electrically connected too with the data processing unit 201 so that the driving signals the user 300 transmits to said device 200 are automatically processed by adapting them to the communication protocol the same device 200 automatically acquired.

More in detail, the device 200 is configured to be able to connect with a remote server 500 acting as a central system for managing the assignments of properties 400 to different users 300.

Such remote server 500 is configured to display, on an Internet portal, a screen allowing the selection of at least one of the properties 400 that is associated with the respective device 200, so that a user 300, by his own electronic user interface device 700 (for example, a PC or a smartphone), can connect thereto and easily select the property he wants to have, by specifying in detail the dates in which he wants to share it and being able to pay always remotely without the need of direct intervention of the owner 600.

The central server 500 then comprises a network interface allowing the transmission of data to the various devices 200, a memory 501 and a data processing unit 505 that supervises the whole system management.

In detail on the memory 501 a plurality of user records, each associated with a user 300, are stored, the user having been previously registered by assignment of a unique code preferably, but without limitation, comprising a user name-password data couple he/she specified or the system assigned automatically.

The memory 501 further comprises a plurality of records each associated with a respective property 400, in which for each of them the name of the property, its position, its hourly or daily or weekly costs are stored, and also its use status: if it is free—i.e. ready to be shared—the field relating to its use status does not point to any user's record; on the contrary, if it is has been assigned yet to a user 300, the field relating to its use status will point to the respective user's record and, in a field of time interval or remaining use time, there will be an indication of the date and, if necessary, of the use time-limit hour of the afore said property 400, therefore on the portal the central server 500 displays also properties currently assigned for use to some user 300, but that will be present from the date or time immediately subsequent to that of the use time-limit of the current user, are displayed. Advantageously, this allows managing also future sharing just in the immediate future, and is particularly advantageous where the property 400 can be shared also in short time intervals.

On the record of each property 400 it is further stored a list or a plurality of use, activating, deactivating commands or commands for driving the various electric and/or electromechanical devices 402 which are on the property itself. When the system is initially configured, the owner possibly selects which of these commands can be submitted to the user and which, on the contrary, must be marked as hidden—for example by a flag apposition—and not submitted to the user 300 but only being the privilege of the system administrator or the same owner.

The submission of the commands on the user interface device 700 can advantageously happen whether through a Web portal, being loaded at least temporarily on the user interface device 700, or through a specific processor program, that can be unloaded by the user 300 directly from the portal of the central server 500 manually or automatically, when the selection of a particular property 400 submitted therein has been confirmed.

The data processing unit of the central server 500 further allows a centralized control of the status of all devices 200 connected thereto, so as to allow the operation to be rapidly re-established if breakdowns happen. This is possible since at preferably regular time intervals the central server sends, on the Internet 902, messages requiring the status transmission towards the electronic devices 200 associated therewith on the records of the memory 501. To these messages, each of the electronic devices replies by sending its own unique code (in order to be recognized among many) and its status. Alternatively, messages requiring status transmission can be broadcasted and, alternatively, they can be sent specifically to each electronic device 200.

As depicted in FIG. 3 and FIG. 4, when a user is looking for a property 400 to be shared, the system object of the present invention first of all checks the acceptance of connection request (block 1000) and then assigns an unique code thereto, as described above, in order to allow the identity of the user 300 to be kept track.

Through the portal displayed by the central server unit 500, then the user 300 checks if the property 400 he is interested in is available in the date or hours he needs (block 1001); in a positive case, he selects it (block 1002) causing the activation of the procedure associating the user 300 with the selected property inside the memory 501.

By doing so, in detail, the field associated with the user in the record storing the property 400, is provided with a pointer pointing just to the user's records.

Obviously, such an association happens definitively only when the user payed for the time he wants to keep the shared property. The payment occurs by pre-payed credit cards or debit cards according to a known on-line paying procedure.

Then the central server 500 transmits an authorizing code to the user interface device 700 of the selected user 300, with which he can interact with the property 400 by sending detailed managing and/or activating and/or deactivating commands of the electric and/or electromechanical device 402 directly from his own user interface device 700. Alternatively, the central server 500 transmits, to said electronic user interface device 700, a command requiring the transmission of unique coding with which the latter-replies by sending data containing any information (for example the IMEI code), so that an association between the user 300 associated to the user interface device 700 and the device 200 can be uniquely generated. In this way only the user 300, which effectively payed the shared property, will be able to interact through his user interface device with the electric and/or electromechanical device 402, and no one else. Then, the command requiring the transmission of the unique coding and the authorizing code sent by the central server realize means or codes for the unique authorization which are able to create an electronic association, at least temporary, between the user interface device 700 associated with the user and the electric and/or electromechanical device 402. Then a portal with a plurality of commands usable on a given selected property 400 is displayed on the user interface device 700.

When the user 300 operates on his own user interface device 700 to send, for example, a command for opening a door 401 of a garage or else a command for closing a lock of a shared car, two alternatives can happen.

In a first preferred embodiment of the system object of the present invention, illustrated in FIG. 3 (and referring to the block 1005 of FIG. 4), said command is transmitted from the user interface device 700 towards the electronic and/or electromechanical device 402 always through a passage in the server system 500.

In this case, the user interface device 700 is configured to always transmit the command to the central server 500. The latter receives the command, selects in the memory the user's record whose user 300 corresponds to the user interface device 700 (it checks the means or unique authorizing codes) and the proceeds to the command retransmission directly to the specified electric and/or electromechanical device.

Such a solution is the simplest from the configuration point of view of both the user interface device 700 and the electronic device 200: both of them respectively "see" a unique electronic interjecting device, from the control reception point of view. However, in this case the system is configured with a central star node, in case of collapse the latter disabling the operation of the whole system. As depicted in FIG. 3, following the retransmission of the command by the server 500 to the electronic device 200, there is the retransmission by the latter of a feedback signal then sent to the user interface device 700.

In particular, optionally, also the date or the hour of use time-limit of the property 400 can be transmitted to the electronic device 200 associated with the property. Advantageously, in this way also in case of collapse of the central server 500, the user can not use the property out of the given time or dates, as the same electronic device 200 itself will not accept further commands anymore.

As previously mentioned, the access to dialog between user interface devices 700 and the electronic device 200 can happen if the two are closed one another. This allows managing more easily the data communication structure that can be implemented, for example and without limitation, by NFR technology or similar (ZigBee protocol or another one).

In the configuration step, it is possible to configure the server system 500 and each electronic device 200 so that the user is allowed interacting only with and over a subgroup of commands belonging to those available.

This means that, if for example the owner 600 provides a house 400 but does not want the user 300 e.g. to use the irrigation system, even if the latter can be managed in a home automated and remote system, the command for activating and/or deactivating the irrigation system will not be submitted on the user interface device 700. Such a command, even if stored on the record of the property 400 in the memory 201, is not visible for the user 300 but, for example, only for the owner 600.

Lastly, on each electronic device 200 there can be advantageously a bar code or a QR code which can be read by the user interface devices and, through the reading by an optical reader just in the user interface device, cause a direct connection with the latter to the Internet portal displayed by the central server 500. This has the advantage that, also in case of simple passage of a user near a shared property, he can proceed easily to check the availability thereof and also proceed with the immediate payment so that to start enjoying it instantly.

Lastly, it is evident that variations, additions and modifications obvious for a person skilled of the art can be applied to the system object of the present invention, without thereby departing from the protection scope provided by the enclosed claims.

The invention claimed is:

1. A method for remotely controlling access of at least one user (300) to one or more properties (400) belonging to an owner (600) in order to share said properties (400), the method comprising the steps of:
   a) providing an electric interface device (200) that is connected to a control device (402) associated with a property (400) of said owner (600), said electric interface device (200) configured to cause at least one interaction with said property (400) where said interaction is any of electric, electromechanical, mechanical and optical;
   b) establishing a data communication between said electric interface device (200) and a mainframe (500), the mainframe comprising a memory (501) that contains connection data concerning said electric interface device (200), and also comprising managing means (505) that manages sharing the property with said user (300);
   c) temporarily assigning to said user (300) an authorization to carry out said interaction with said electric interface device (200) in order to share the property of the electric interface device (200) with said user,
   said assigning including storing an assignment in the memory (501) of said mainframe (500) with information of an identification of the user (300), information of the property to be shared (400), and information of the interaction with said electric device (200) associated with the property (400) to be shared,
   said assigning enabling said user (300) to send at least one command to said electric interface device (200) from a user interface device (700) of the user (300) that causes said electric device (200) to carry out said interaction with said electric device (200) associated with the property (400) to be shared.

2. The method according to claim 1, further comprising: before said step c), logging of the user (300) through an Internet or Intranet portal on which said one or more properties (400) associated with said owner are identifiable, which have been provided by said owner (300) to a user (600) for sharing one or more interactions with said at least one electric interface device (200) associated with one or more properties (400).

3. The method according to claim 1, further comprising: before said step c), checking an availability of said property (400) and of available interactions corresponding to a time period required by said user (300).

4. The method according to claim 1 wherein, before said step c), checking access credentials of said user (300), and requiring authorization of the owner (600) before permitting the sharing of the property (400) to proceed to enable use of the interaction with the electric interface device (200) of the property.

5. The method according to claim 1 wherein, after said step c), the access to said property (400) and the interactions therewith by said user (300) are required by said user (300) to said mainframe (500) through an interface device (700) associated with said user (300).

6. The method according to claim 1 wherein, after said step c), notifying said owner of any interaction of said user (300) with the electric interface device (200) associated with said property (400) via said mainframe (500).

7. The method according to claim 1, wherein the authorization to carry out the interaction with the electric interface device (200) associated with said property (400) by said user (300) is limited to and assigned time interval stored in the memory (501) of said mainframe (500).

8. A system for remotely controlling access of at least one user (300) to one or more properties (400) belonging to an owner (600) in order to share said properties (400), the system comprising:
   at least one electric interface device (200) connected to a control device (402) associated with a property (400) of said owner and configured to perform at least one interaction with said property (400), said interaction being any of electric, electromechanical and optical;

a mainframe (500) incorporating at least one memory (501) that contains connection data concerning said electric interface device (200), and managing means (505) that manages sharing the property with said user (300), wherein said managing means (505) are programmed to temporarily assign to the user (300) an authorization to carry out said interaction with said electric interface device (200), and wherein the identification data of the user (300), the property (400) to be shared, and the interaction to be allowed with said at least one electric interface device (200) are stored in the memory (501) of said mainframe (500).

9. The remote controlling system according to claim 8, wherein the managing means (505) of said mainframe (500) are configured to send to the electric interface device (200) driving signals to activate the authorized interaction upon receiving a request from the user to execute the authorized interaction.

10. The remote controlling system according to claim 8, wherein the memory (501) of said mainframe (500) further comprises data relating to a plurality of commands enabled by said owner (600) for the interaction of said user (300) with said at least one electric interface device (200).

11. The remote controlling system according to claim 8, further comprising:
an electronic user interface device (700) of the user (300), wherein said electronic user interface device (700) comprises transceiving means for the remote connection with said mainframe (500).

12. The remote controlling system according to claim 11, wherein said electronic user interface device (700) is configured to
i) present to the user (300) a list of commands enabled for the user interacting with said electric interface device (200), and
ii) to transmit the selection of at least one command of said list of commands to said mainframe (500) for causing an interaction with the property.

13. The remote controlling system according to claim 11, wherein said electronic user interface device (700) is configured to read and interpret at least one of a bar code or a QR code associated with said property (400), and
wherein said at least one of bar code or said QR code have at least information concerning a connection between said property and said mainframe (500).

14. The remote controlling system according to claim 8, wherein said electric interface device (200) comprises a plurality of outputs for the connection with said control device (402) associated with said property (400).

15. The remote controlling system according to claim 8, wherein said electric interface device (200) comprises:
first interface means (204, 205, 206) that interfaces with the control device (402) with the property (400);
second interface means (202, 203) that interfaces with the mainframe (500), said second interface means configured to receive at least one signal for any of driving, managing, activating and deactivating said control device (402) associated with the property (400); and
at least one data processing unit (201) configured to generate driving signals addressed to said control device (402) associated with the property (400) by processing said driving signals to said control device (402) in compliance with a data protocol specific to said control device (402).

16. The remote controlling system according to claim 15, wherein said electric interface device (200) is configured in accordance with an automatic configuration mode between said first interface means (204, 205, 206) said control device (402), and
wherein, in said automatic configuration mode, said electric interface device (200) automatically acquires said data protocol specific to said control device (402).

17. The remote controlling system according to claim 15, wherein said second interface means (202, 203) comprise at least one network interface electrically connected with at least one data processing unit (201), and is configured to allow remotely receiving said signals for driving, managing, activating and/or deactivating the control device (402) by way of said mainframe (500) to which said user (300) transmits said commands by means of an electronic user interface device (700).

18. The remote controlling system according to claim 15, wherein said second interface means (202, 203) comprise at least one antenna configured for receiving radio-frequency signals transmitted by the electronic user interface device (700) associated with said user (300).

19. The remote controlling system according to claim 15, wherein said first interface means (204, 205, 206) comprise at least one interface selected from the group consisting of an optoelectronic interface (204), an electric transceiving interface (205), and an electromechanical actuating interface (206).

20. A computer program product stored on a storage medium readable by a computer equipped with a communication interface, comprising executable code that, upon execution by the computer, implement the following functions:
remotely check an availability of a property (400) associated with an electric interface device (200) a control device (402) that is associated with a property (400), whereby the checking causes establishment of a communication between the computer and a mainframe (500) on which information of a list of properties (400) is stored, where each property of the list of properties is associated with at least one respective electric interface device (200); and
transmit a request associated with said property to said mainframe (500) directed to said electric interface device (200) associated with said property (400),
wherein said request is checked by said mainframe (500) as being authorized to a user of the computer, and following receipt of an authorized request from the user (300) via the computer, one or more commands corresponding to the request are sent by the mainframe (500) to the control device (402) responsive to actuation of a user interface device (700) of the computer.

21. The computer program product according to claim 20, wherein the user interface device (700) presents a list of commands enabled for the user (300) and executable by the electric interface device (200), and
wherein said list of commands are recorded on the mainframe (800) and predefined by an owner (600) of the property (400) to which said electric interface device (200) is associated.

* * * * *